United States Patent [19]

Razzano

[11] 4,341,888
[45] * Jul. 27, 1982

[54] DIORGANOPOLYSILOXANE COPOLYMERS AND PROCESS FOR THE PREPARATION THEREOF

[75] Inventor: John S. Razzano, Watervliet, N.Y.

[73] Assignee: General Electric Company, New York, N.Y.

[*] Notice: The portion of the term of this patent subsequent to Feb. 10, 1993, has been disclaimed.

[21] Appl. No.: 178,175

[22] Filed: Aug. 14, 1980

Related U.S. Application Data

[63] Continuation of Ser. No. 790,010, Apr. 22, 1977, abandoned, which is a continuation of Ser. No. 574,332, May 5, 1975, abandoned, which is a continuation-in-part of Ser. No. 463,435, Apr. 24, 1974, Pat. No. 3,937,684.

[51] Int. Cl.$^3$ .............................................. C08G 77/06
[52] U.S. Cl. .................................... 528/14; 528/18; 528/21; 528/22; 528/23; 528/33; 528/37
[58] Field of Search ................... 528/37, 14, 18, 22, 528/23, 33, 21

[56] References Cited

U.S. PATENT DOCUMENTS

| | | |
|---|---|---|
| 3,002,951 | 10/1961 | Johannson ............................ 528/37 |
| 3,179,619 | 4/1965 | Brown .................................. 528/37 |
| 3,433,765 | 3/1969 | Geipel .................................. 528/37 |
| 3,481,898 | 12/1969 | Davies et al. ........................ 528/37 |
| 3,779,987 | 12/1973 | Razzano ............................... 528/37 |
| 3,937,684 | 2/1976 | Razzano ............................... 528/37 |
| 4,272,624 | 6/1981 | Razzano ............................... 528/37 |

*Primary Examiner*—Melvyn I. Marquis

*Attorney, Agent, or Firm*—Hedman, Casella, Gibson & Costigan

[57] ABSTRACT

Diorganopolysiloxane copolymers having a viscosity from 50 to 200,000,000 centipoise at 25° C., are produced by reacting a mixture of (i) a cyclic tetrasiloxane having at least one silicon-bonded organo substituent of three to eight carbon atoms, with (ii) a cyclic siloxane having 3 to 6 siloxane units, (i) being present in an amount of 30 to 98 mol % of the mixture of (i) and (ii), at a temperature in the range of 0° to 90° C. and in the presence of 5 to 300 parts per million of a catalyst comprising cesium hydroxide, a silanolate thereof, or a compound of the formula,

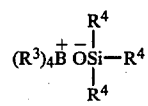

wherein $R^3$ is alkyl of 1 to 8 carbon atoms, cycloalkyl of 4 to 8 carbon atoms or phenyl, B is nitrogen or phosphorous, $R^4$ is alkyl of 1 to 8 carbon atoms, cycloalkyl of 4 to 8 carbon atoms, phenyl, a siloxane chain of unit formula $R_a^5SiO_{(4-a)/2}$ and mixtures thereof, wherein $R^5$ is monovalent hydrocarbon or halogenated monovalent hydrocarbon, and a is from 1.5 to 2.5. Especially useful products of the process are copolymers having (i) siloxane chain units of the formula (i) R $R^1$ SiO and (ii) $R_2^2$ SiO, (i) being present in an amount of 30 to 85 mol % of the copolymer units, and wherein $R^1$ is alkyl, halogenated alkyl or cycloalkyl, and preferably, perfluoroalkyl, R is the same as $R^1$ and, in addition, methyl, ethyl, vinyl or phenyl; and $R^2$ is, independently, methyl, ethyl, vinyl or phenyl.

9 Claims, No Drawings

DIORGANOPOLYSILOXANE COPOLYMERS AND PROCESS FOR THE PREPARATION THEREOF

CROSS-REFERENCE TO RELATED APPLICATIONS

This application is a continuation of U.S. application Ser. No. 790,010, filed Apr. 22, 1977 and now abandoned, which is in turn a continuation of U.S. application Ser. No. 574,332, filed May 5, 1975 and now abandoned, which is in turn a continuation-in-part of U.S. application Ser. No. 463,435, filed Apr. 24, 1974, now U.S. Pat. No. 3,937,684. The inventor in all of the above applications and patent is John S. Razzano, the applicant herein.

FIELD OF THE INVENTION

The present invention relates to a process for producing diorganopolysiloxane copolymers from mixtures of cyclic siloxanes and, more specifically, to the production of such copolymers from mixtures of (i) cyclic tetrasiloxanes wherein at least one of the organo groups attached to the silicon atom has three or more carbon atoms with (ii) a cyclic siloxane co-monomer.

BACKGROUND OF THE INVENTION

It is well known that siloxane copolymers can be prepared to provide an advantageous balance of properties and economics. In comparison with mixtures of homopolymers, the copolymers are generally more effective in producing any desired property, and the tendency to separate on a macroscopic scale is avoided. Copolymers of diorganopolysiloxanes can be prepared by mixing and polymerizing the respective cyclic siloxanes, but if one of them has a silicon-bonded aliphatic or haloaliphatic radical of three carbon atoms or greater, then only up to 20 mol % of the other co-monomer, which does not include such a structural limitation can be incorporated. Johannson, U.S. Pat. No. 3,002,951, illustrates the problem and the limitation. Johannson discloses that if a cyclic trisiloxane, having a 3 or more carbon silicon-bonded organo substituent, is reacted in admixture with another cyclic diorganosiloxane compound, in the presence of a strong alkali catalyst, only up to 10 mol % of the co-monomer will polymerize. It is stated in Johannson that if one starts with cyclic tetrasiloxanes and subjects them to alkaline polymerization conditions, that no apparent polymerization occurs.

Surprising, now, it has been discovered that under some conditions, the cyclic tetramers will readily homopolymerize, and also copolymerize. Most surprisingly, copolymerization with the cyclic tetramer will occur over a wide variety of composition ranges, and is not limited to the 10 mol % maximum found to be limiting with the cyclic trimer as reported by Johannson.

In general processes for producing diorganopolysiloxane gums and oils, diorganochlorosilanes of high purity are used as starting materials, and hydrolyzed in water at about 20°-25° C. The hydrolyzate is separated from the water and then a catalyst, such as potassium hydroxide, is added. The mixture is heated at temperatures of above 100° C. for from 1 hour to 8 hours, the cyclic trisiloxanes, cyclic tetrasiloxanes, cyclic pentasiloxanes and the like are removed by distillation. Cracking of the hydrolysate in this fashion results in the production of a large amount of cyclic siloxanes from the hydrolyzate, and the most predominant fraction is the cyclic tetrasiloxane. It is known that methyl-, vinyl-, or phenyl-substituted such tetrasiloxanes in pure form can be equilibrated with a catalyst, such as potassium hydroxide to form oils and gums.

At equilibration, however, some of the already formed diorganopolysiloxane oil or gum also breaks down and reforms cyclic tetrasiloxane. Thus, at most only 85% of the original cyclic tetrasiloxanes can be converted to the desired diorganopolysiloxane gum or oil, with the other 15% by weight of the cyclic polysiloxanes being present in equilibrium with diorganopolysiloxane gum or oil. Copolymerization also results in such equilibria.

At equilibration, then, the catalyst can be neutralized and the volatiles removed to produce the desired diorganopolysiloxane oil or gum. This procedure can be used to obtain a diorganopolysiloxane copolymer oil or gum of anywhere from 30 to 200,000,000 centipoise at 25° C.

Pierce et al, U.S. Pat. No. 2,979,519, disclose that because the cyclic tetrasiloxanes cannot be homopolymerized, it was surprising to find that cyclic trisiloxanes could be. However, a difficulty with the Pierce et al procedure is that the cyclic trisiloxanes themselves are formed in low yield during the initial cracking of the hydrolyzate with potassium hydroxide. This necessitates the use of energy consuming procedures, such as high reflux ratios to maximize the yield of cyclic trisiloxanes from the cracking process. The tetramers, on the other hand, form more readily. Thus, the process for forming polymers from cyclic trisiloxanes is more expensive than it would be if cyclic tetrasiloxanes could be used.

It has now been unexpectedly found that at certain low temperature ranges which were not envisioned previously and in the presence of certain selected catalysts, cyclic tetrasiloxanes can be mixed with cyclic co-monomers and the mixture can be equilibrated to form copolymers in relatively high yield, even where one of the organo substituent groups attached to the silicon atom is aliphatic or haloaliphatic of 3 carbon atoms, or more, such as the $-CH_2CH_2R^7$ radical, where $R^7$ is a perfluoroalkyl radical. Such cyclic tetrasiloxanes in admixture with other cyclics can be equilibrated at relatively high yields to produce low molecular weight copolymer oils for use as plasticizers or defoamers or high molecular weight diorganopolysiloxane copolymer gums suitable for forming heat vulcanizable silicone rubber compositions.

The discovery has prime importance to the use of methyl-3,3,3-trifluoromethylsiloxane cyclic tetramer because the conditions allow the copolymerization of the fluorosilicone tetramer with dimethyl tetramer (or dimethyl trimer) in the range of 30 to 98 mol % fluorosilicone. The ability to produce such copolymers is an advance in the art since, if the full solvent resistance properties of the fluorosilicone were not needed, a blend of fluorosilicone polymer with methyl polymers would be necessary. However, a copolymer is more efficient in solvent resistance than a blend at the same fluorosilicone content. In addition, while stable blends of fluorosilicone and methyl polymers can be made for high viscosity gums, it is impossible to make stable blends of lower viscosity oils, such as would be used in room temperature vulcanizing and fluid products, because the incompatibility of the fluorosilicone oil with the methyl oil will cause separation of these two components. The best balance of economy and solvent resistance is achieved with a copolymer.

It is, accordingly, a principal object of the present invention to provide a process for producing diorganopolysiloxane copolymer gums or oils in high yield, using a cyclic tetramer wherein at least one of the organo groups attached to the silicon atom is aliphatic or haloaliphatic of at least three carbon atoms or more.

Another object of the present invention is to provide low molecular weight diorganopolysiloxane copolymer oils and gums having a viscosity from 30 to 200,000,000 centipoise at 25° C., and wherein at least one of the organo groups attached to the silicon atoms in one of the co-monomers is aliphatic or haloaliphatic of 3 carbon atoms or more, by a process comprising equilibrating cyclic tetrasiloxanes in admixture of cyclic co-monomers at low temperatures in the presence of certain select catalysts.

A further object of the present invention to provide diorganopolysiloxane copolymer oils or gums having a viscosity from 30 to 200,000,000 centipoise at 25° C., wherein at least one of the co-monomers comprises 30 to 85 mol % of the copolymer units, and includes organo groups attached to the silicon atoms having at least 3 carbon atoms, and particularly, a $-CH_2CH_2R^7$ substituent group, where $R^7$ is perfluoroalkyl, using a cyclic tetrasiloxane as a co-monomer.

SUMMARY OF THE INVENTION

In accordance with the foregoing objects, the present invention provides a process for producing diorganopolysiloxane copolymer oils or gums having a viscosity from 50 to 200,000,000 centipoise at 25° C. comprising (a) reacting a mixture of
(i) a cyclic polysiloxane of the formula,

or a mixed such polysiloxane and
(ii) a cyclic polysiloxane of the formula,

wherein y is from 3 to 6, or mixed such polysiloxanes, (i) being present in an amount of from 30 to 98 mol % of the mixture of (i) and (ii) at a temperature in the range of 0° to 90° C. in the presence of 5 to 300 parts per million of a catalyst selected from the group consisting of CsOH, a silanolate thereof, or a compound of the formula,

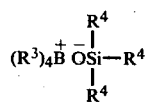

wherein $R^3$ is alkyl of 1 to 8 carbon atoms, cycloalkyl of 4 to 8 carbon atoms or phenyl, B is nitrogen or phosphorous, $R^4$ is alkyl of 1 to 8 carbon atoms, cycloalkyl of 4 to 8 carbon atoms, phenyl, a siloxane chain of the unit formula, $R_a{}^5SiO_{(4-a)/2}$ and mixtures thereof wherein $R^5$ is monovalent hydrocarbon or halogenated monovalent hydrocarbon, a is from 1.5 to 2.5, and (b) neutralizing the catalyst in the reaction mixture after equilibrium has been reached, and wherein $R^1$ is alkyl, halogenated alkyl or cycloalkyl, each of 3 to 8 carbon atoms, R is the same as $R^1$ and in addition, methyl, ethyl, vinyl or phenyl, and $R^2$ is, independently, methyl, ethyl, vinyl or phenyl.

A preferred embodiment comprises neutralizing the catalyst with an inorganic acid, such as phosphoric acid, or an organosilane of the formula $R_b{}^6SiX_{4-b}$, wherein $R^6$ is alkyl, cycloalkyl, vinyl or phenyl, and, preferably, alkyl, cycloalkyl of 1 to 8 carbon atoms, and X is bromine or chlorine and b is from 0 to 3.

It is preferred to obtain the product copolymer is essentially pure form, after the equilibration and neutralization steps are complete by heating the mixture to 150° to 200° C. at a vacuum of 1 to 100 millimeters of mercury to strip off all volatiles. The equilibration reaction preferably will require from ½ hour to 10 hours and, more preferably, from 50 minutes to 10 hours. For maximum efficiency, it is preferred that the mixture of cyclic tetrasiloxanes to be copolymerized will have less than 20 parts per million of trifunctional silanes, less than 200 parts per million of monofunctional siloxanes, and less than 10 parts per million of water. The co-monomer (ii) can be a cyclic trimer, tetramer, pentamer or hexamer. These are known in the art, see, e.g., the Johannson patent cited above. The amount of co-monomer (i) in admixture with (ii) will vary between 30 and 98 mol %. Preferably, (i) will comprise from 30 to 85 mol % of (i) and (ii). Further, preferably, the $R^1$ substituent radical in the above formula of the tetrasiloxanes is $R^7CH_2CH_2$, where $R^7$ is a perfluoroalkyl radical of 1 to 6 carbon atoms, and R and $R^2$ are each methyl and y is 3 or 4. The process provides diorganopolysiloxane copolymer oils or gums of from 30 to 200,000,000 centipoise viscosity at 25° C. depending on whether or not, for example, a conventional chain-stopper is employed.

Also provided by the invention are novel diorganopolysiloxane copolymer oils or gums having a viscosity of from 30 to 100,000,000 centipoise viscosity at 25° C., which have copolymer units as defined for (i) and (ii) above in which the amount of (i) ranges from 30 to 85 mol % of (i) and (ii).

DETAILED DESCRIPTION OF THE INVENTION

The R, $R^1$ and $R^2$ substituents in cyclic tetrasiloxanes (i) and cyclic siloxanes (ii) above, are representative of monovalent hydrocarbon radicals and halogenated monovalent hydrocarbon radicals that are well known as attachment to silicon atoms. However, at least the $R^1$ substituent contains 3 carbon atoms, or more. In the formulae above, R is the same as $R^1$ or is methyl, ethyl, vinyl and phenyl. $R^1$ is alkyl, such as propyl, butyl or hexyl, and the like, of 3 to 8 carbon atoms; halogenated alkyl, such as 3-chloropropyl, 4-chlorobutyl, 3-fluorophenyl, 3,3-difluoropropyl, 3,3,3-trifluoropropyl, and the like of 3 to 8 carbon atoms, cycloalkyl of from 4 to 8 carbon atoms, such as cyclopentyl, cyclohexyl, cycloheptyl, and the like. Preferably, the $R^1$ is a substituted alkyl group such as, $-CH_2CH_2R^7$, wherein $R^7$ radical is perfluoroalkyl containing from 1 to 6 carbon atoms, such as perfluoromethyl, perfluoroethyl, perfluorohexyl, and the like. Most preferably, the $R^1$ is 3,3,3-trifluoropropyl, R is methyl or ethyl, and $R^2$ is methyl or ethyl, the latter two especially preferably being methyl.

Substituent $R^3$ is generally monovalent hydrocarbon, halogenated monovalent hydrocarbon of 1 to 8 carbon atoms and is more preferably, alkyl of 1 to 8 carbon atoms, such as methyl, ethyl, propyl, and the like; cycloalkyl of 4 to 8 carbon atoms, cyclohexyl, cycloheptyl, and the like or phenyl.

The $R^4$ substituent may be any monovalent hydrocarbon radical and halogenated monovalent hydrocarbon radical generally used as a substituent group on silicon atoms, but is preferably, alkyl of 1 to 8 carbon atoms, such as methyl, ethyl, propyl, butyl, and the like; cycloalkyl of 4 to 8 carbon atoms, such as cyclopentyl, cyclohexyl, cycloheptyl, or aryl, such as phenyl, $R^4$ may also be polysiloxane linear derivative, such as a polymeric silicone material having the unit formula $R_a{}^5SiO_{(4-a)/2}$, wherein $R^5$ is monovalent hydrocarbon or halogenated monovalent hydrocarbon, and preferably, is alkyl of 1 to 8 carbon atoms; cycloalkyl of 4 to 8 carbon atoms, vinyl or phenyl, and a in the unit formula is from 1.5 to 2.5. Preferably, in such polymeric chains, $R^4$ is a linear polymeric chain, and $R^5$ is a methyl, phenyl, vinyl or 3,3,3-trifluoropropyl and a in the unit formula is from 1.98 to 2.01.

In the catalyst, preferably two of the $R^4$ substituents are alkyl of 1 to 8 carbon atoms, phenyl or vinyl, and the other $R^4$ substituent is a polysiloxane chain of the unit formula indicated above, while $R^5$ again is methyl, vinyl, phenyl, or 3,3,3-trifluoropropyl, or a mixture of such radicals, and a in the unit formula is from 1.98 to 2.01.

Preferably, starting materials will be obtained from diorganodihalogensilanes of the formula $R^1RSiX_2$ and $R^2SiX_2$, wherein R, $R^1$ and $R^2$ are as previously defined, and X is halogen, such as chlorine or bromine, and preferably, chlorine. Such diorganodichlorosilanes, at a purity of at least 99% by weight, are added to water at room temperature, e.g., 20°–25° C. to provide from 2 to 10 moles of water per mole of the diorganodihalogensilane. In the most preferred case, after the diorganodihalosilanes have been added to the water mixture will contain 20% by weight of HCl. Optimally, hydrolysis may be carried out in the presence of a water-immiscible solvent such as, for example, toluene, xylene, benzene, and the like. The use of a solvent facilitates the separation of the hydrolyzate from the aqueous acid solution. Preferably, a water-immiscible organic solvent is added to the water prior to the addition of the diorganodihalosilanes. The organohalosilanes, preferably at 99+% purity, are added to the water and water-immiscible solvent during ½ hour to 2 hours, with agitation. The hydrolyzate dissolves in the solvent phase, and this is then separated from the water phase. The hydrolyzate and organic solvent are then neutralized with a mild base, such as sodium bicarbonate, to a pH of about 7 to 8. The hydrolyzate product contains mostly cyclic polysiloxanes of from 3 silicon atoms to 10 silicon atoms and low molecular weight linear silanol end-stopped diorganopolysiloxanes. Heating the hydrolyzate to elevated temperatures then is used to remove solvent by overhead distillation. The hydrolyzate is then cracked by a procedure comprising adding from 0.1 to 5% by weight and preferably, from 0.1 to 2% by weight of a cracking catalyst selected from the class consisting of potassium hydroxide and cesium hydroxide, and heating. Preferably, the amount of catalyst that is utilized is from 0.5 to 2% by weight. Preferably, heating temperatures of above 150° C. and between 150° to 200° C. will be used and preferably, heating will be carried out under a vacuum of 5 to 40 millimeters of mercury for from 1 to 5 hours. There will be continually distilled overhead a mixture of cyclic polysiloxanes and, specifically, cyclic tripolysiloxanes, cyclic tetrapolysiloxanes and cyclic pentapolysiloxanes. The cracking procedure is utilized to maximize the formation of these three types of cyclics from the broad range in the hydrolyzate. It permits conversion of 95% by weight of the hydrolyzate cyclic trisiloxanes, cyclic tetrasiloxanes and cyclic pentasiloxanes and predominantly, cyclic tetrapolysiloxanes.

The cyclic tetrasiloxanes may be separated by known distillation procedures from the cyclic trisiloxanes and the cyclic pentasiloxanes. Distillation can be carried out at temperatures of 80° to 200° C. and under pressures of from 1 to 100 millimeters of mercury and, more preferably, at from 1 to 20 millimeters of mercury. Such distillation procedures will lead to essentially pure cyclic tetrasiloxanes of Formula (i) above, and the cyclic trisiloxanes and the cyclic pentasiloxanes can be recycled back into the cracking vessel and mixed with additional hydrolyzate to again produce by the cracking procedure described previously a mixture of cyclic trisiloxanes, cyclic tetrasiloxanes and cyclic pentasiloxanes in 95% yield. Essentially pure cyclic tetrasiloxane of Formula (i), obtained in 70 to 80% yield from the siloxane hydrolyzate, contains less than 200 parts per million of monofunctional siloxy units, and less than 20 parts per million of trifunctional siloxy units. More than the above indicated amount of monofunctional siloxy units or trifunctional siloxy units, should not be present to avoid gelling during the subsequent equilibration according to this invention.

The component (ii) used as co-monomer can also be obtained by hydrolysis and cracking, as described above. The impurity levels should be held to the limits stated to completely avoid problems with gelling.

It is also preferred that there be present less than 10 parts per million of water in the mixture of cyclic tetrasiloxanes (i) and cyclic siloxanes (ii), which is to be utilised in equilibration reaction. Removal of all but traces of water is accomplished by heating to 100° C. or above, with a nitrogen purge. This effectively reduces the water content of the cyclic siloxane mixture to less than 10 parts per million. It has been found that if there is substantially more than this amount of water present in the cyclic siloxanes, then the desired low molecular weight oil or high molecular weight diorganopolysiloxane copolymer gum will be formed at a lower molecular weight than desired.

To prepare the copolymers, the cyclic polysiloxanes, (i) and (ii), above, are placed in a vessel.

To successfully employ cyclic tetrasiloxanes of Formula (i) above, as one co-monomer, in the present process, there are two critical aspects: the temperature of reaction and the nature of the catalyst. Specifically, there will be used 5 to 300 parts per million and, preferably, 10 to 100 parts per million, of the catalyst specified above. Cesium hydroxide, obviously, can also function in the form of a silanolate. Preferably, the copolymerization will be carried out at a temperature of from 0° to 90° C. and more preferably, at a temperature of 15° to 40° C. If a temperature below 0° is used, the polymerization rate is somewhat too slow. The highest yield of diorganopolysiloxane copolymer is obtained when the temperature is between 5° C. to 40° C. with all catalysts except cesium hydroxide, which is best used at a temperature toward the higher end of the range, 70° C. to 90° C. Cesium hydroxide is, of course, a well known material and commercially available. The other catalyst materials are also well known. They are obtained by reacting, for example, a tetra organo ammonium hydroxide with any diorganopolysiloxane fluid or even a cyclic polysiloxane, such as octamethyltetrasiloxane. In the case of the silanolates above, when B is phosphorous, the catalyst is obtained by reacting a tetra organo phosphonium hydroxide compound with any linear polysiloxane fluid or with any cylic polysiloxane, such as octamethylcyclotetrasiloxane. The quaternary ammonium catalysts are obtained in an analogous fashion.

The mixed cyclic siloxane of Formulae (i) and (ii) above, and the catalysts are heated or cooled to the indicated temperature range for from ½ hour to 10 hours, preferably, 50 minutes to 10 hours, during which time equilibrium is reached. At this point, there will be 60 to 85% by weight or more of the cyclic siloxanes converted to the desired diorganopolysiloxane copolymer oil or gum. In this case, there will be 15 to 40% of the cyclic polysiloxanes of Formulae (i) and (ii) in the equilibrated mixture. At this point, the reaction mixture is cooled, e.g., to 0° to 25° C., and there is added the agent to neutralize the catalyst. A number of conventional neutralizing agents may be used but preferably, there will be used either phosphoric acid, or an organohalosilane or halosilane of the formula $R_b^6SiX_{4-b}$, wherein $R^6$ is alkyl, cycloalkyl, vinyl, or phenyl, the alkyl and cycloalkyl groups having from 1 to 8 carbon atoms, and X is bromine or chlorine and b is from 0 to 3.

After neutralization, the reaction mixture is heated at elevated temperature, e.g., 150° to 200° C. under a vacuum of 1 to 100 millimeters of mercury. This strips off all cyclic polysiloxanes, and these may be recycled into the equilibration vessel. There remains a diorganopolysiloxane copolymer oil or gum.

In accordance with known techniques, the viscosity of the copolymer can be controlled by adding a chain-stopper, to the mixture of co-monomers (i) and (ii) and catalyst. Such chain-stoppers can be, for example, disiloxanes or low molecular weight diorganopolysiloxanes having triorganosiloxy terminal units, that is, having monofunctional terminal units. The organo substituents in such chain-stoppers are typically alkyl of 1 to 8 carbon atoms, vinyl, phenyl or cycloalkyl of 4 to 8 carbon atoms. Also, they can comprise haloalkyl of from 1 to 8 carbon atoms, such as trifluoropropyl. As will be obvious, the amount of chain-stopper that is used in the equilibration mixture will be selected to produce the desired final molecular weight or viscosity of the diorganopolysiloxane copolymer oil or gum. Illustratively, higher amounts, e.g., 30 ml. of chain stopper per 100 ml. of mixed cyclics will produce the lowest molecular weight oils, e.g., 50 centipoise at 25° C. Smaller amounts, e.g., 0.01 ml. of chain-stopper per 100 ml. of mixed cyclics will produce higher molecular weights, e.g., 100,000 centipoise at 25° C. The highest molecular weights will be obtained without chain-stoppers.

The process of this invention produces linear diorganopolysiloxane copolymer oils or gums in which each silicon atom in the respective units has an R, $R^1$ or $R^2$ group. The copolymer oil or gum will have a viscosity of between 50 and 200,000,000 centipoise at 25° C. Obviously, the copolymer oils or gums can be formulated, e.g., by mixing with fillers, such as fumed silica or precipitated silica; extending fillers, such as zinc oxide, iron oxide, titanium oxide, diatomaceous earth, and the like; heat aging additives, such as iron oxide; pigments, and other additives, such as flame retardants, for instance, platinum, by itself, or in combination with other materials and self-bonding additives, such as for instance, triallylisocyanurate. The copolymer gums can be mixed into a uniform mass to which is added a curing agent, e.g., a peroxide curing agent, such as benzoyl peroxide or dicumyl peroxide. The resulting composition can be cured at elevated temperatures, e.g., from 100° to 300° C., or they can be cured by radiation to produce a silicone copolymer elastomer.

DESCRIPTION OF THE PREFERRED EMBODIMENTS

The following examples are for the purpose of illustrating the present invention. They are not to be construed to limit the invention in any manner whatsoever.

EXAMPLE 1

In a resin flask is placed 30 parts of a mixture of (i) 1,3,5,7-tetramethyltetrakis-1,3,5,7-(3,3,3-trifluoropropyl)cyclotetrasiloxane and (ii) octamethylcyclotetrasiloxane, (i) being present in an amount of 66 mol % of the mixture of (i) and (ii). The flask is purged with dry nitrogen for 30 minutes to dry the mixtures of cyclic polysiloxanes to a level of less than 10 parts per million of water. The flask is heated to 80° C. and 40 ppm of cesium hydroxide, in the form of a silanolate, is added. The reaction is allowed to continue for 6 hours. The catalyst is deactivated and neutralized by adding a 1% solution of phosphoric acid in tetrahydrofuran. The batch is now heated to 150° C. and vacuum is applied to 1 mm Hg. Volatiles are distilled from and are collected in a trap cooled in dry ice/acetone. The final product is obtained in 83% yield and comprises a copolymer having methyl,3,3,3-trifluoropropyl siloxane and dimethyl siloxane units.

EXAMPLE 2

The procedure of Example 1 is repeated, using 54 mol % of (i) in the mixture of (i) and (ii). The yield of copolymer is 85%.

EXAMPLE 3

The procedure of Example 1 is repeated, using 37 mol % of (i) in the mixture of (i) and (ii). The yield of copolymer is 87%.

EXAMPLE 4

The procedure of Example 1 is repeated, but there is added to the reaction flask 0.4 ml. of a chain-stopper consisting of a dimethylvinyl terminated methyl-3,3,3-trifluoropropyl polysiloxane averaging 5 siloxane units. The mixture is brought to 70° C. and maintained there as dry nitrogen is swept through the flask to dry the batch for 20 minutes. Then 0.3 ml. of a solution of cesium hydroxide in methanol is added and the nitrogen purge rate is accelerated to drive off the solvent methanol. The batch is maintained at 70° C. for 12 hours. One drop of dimethyldichlorosilane is added to neutralize and deactivate the cesium hydroxide. The batch is raised to 125° C. and vacuum is applied to remove volatiles. The copolymer product is in the form of an oil having a viscosity of 6000 centipoise at 25° C. and is terminated with dimethylvinyl end groups.

Instead of the cesium catalyst, tetramethyl ammonium silanolates can be used. With this catalyst, the preferred temperature is between 10° and 40° C.

The above detailed description is seen to provide a simple and straight-forward procedure for producing low molecular weight and high molecular weight diorganopolysiloxane copolymer oils and gums from cyclic tetrasiloxanes wherein one of the substituent groups attached to the silicon atom in such gums is a high molecular weight substituent group, that is, an aliphatic or haloaliphatic radical of 3 carbon atoms or more, in admixture with cyclic co-monomers. The copolymer gums may be advantageously used to produce silicone elastomers having outstanding properties such as, for instance, increased resistance to degradation by oil, as compared to silicone elastomers formed from diorganopolysiloxane gums where the organo groups are mostly composed of low molecular weight and aromatic substituent groups such as methyl or vinyl. The oils are useful as plasticizers, grease components, and the like.

I claim:

1. A process for producing diorganopolysiloxane copolymers having a viscosity of from 50 to 200,000,000 centipoise at 25° C. comprising (a) reacting a mixture of (i) a cyclic polysiloxane of the formula, $$(RR^1SiO)_4$$

or a mixed such polysiloxane and
(ii) a cyclic polysiloxane of the formula, $$(R_2{}^2SiO)_y$$

wherein y is from 3 to 6, or mixed such polysiloxanes, (i) being present in an amount of from 30 to 98 mol % of the mixture of (i) and (ii) at a temperature in the range of 0° to 90° C. in the presence of 5 to 300 parts per million of a catalyst selected from the group consisting of CsOH, a silanolate thereof, or a compound of the formula,

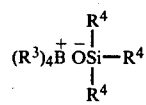

wherein $R^3$ is alkyl of 1 to 8 carbon atoms, cycloalkyl of 4 to 8 carbon atoms or phenyl, B is nitrogen or phosphorous, $R^4$ is alkyl of 1 to 8 carbon atoms, cycloalkyl of 4 to 8 carbon atoms, phenyl, a siloxane chain of the unit formula, $R_a{}^5SiO_{(4-a)/2}$ and mixtures thereof wherein $R^5$ is monovalent hydrocarbon or halogenated monovalent hydrocarbon, a is from 1.5 to 2.5, and (b) neutralizing the catalyst in the reaction mixture after equilibrium has been reached, and wherein $R^1$ is $R^7CH_2CH_2-$ and $R^7$ is perfluoroalkyl of 1 to 6 carbon atoms, R is the same as $R^1$ and in addition, methyl, ethyl, vinyl or phenyl, and $R^2$ is, independently, methyl, ethyl, vinyl or phenyl.

2. A process as defined in claim 1 wherein the catalyst is neutralized with phosphoric acid or a compound of the formula, $R_b{}^6SiX_{4-b}$, where $R^6$ is alkyl, cycloalkyl, vinyl or phenyl, X is bromine or chlorine, and b is from 0 to 3.

3. A process as defined in claim 1 including after step (b) the further step comprising heating the reaction mixture to 150° to 200° C. at a vacuum of 1 to 100 mm of Hg to strip off all volatiles.

4. A process as defined in claim 1 wherein the cyclic polysiloxanes are reacted with the catalyst for from ½ hour to 10 hours.

5. A process as defined in claim 1 wherein the cyclic polysiloxanes and mixtures thereof contain less than 20 parts per million of trifunctional siloxanes, less than 200 parts per million of monofunctional siloxanes, and less than 10 parts per million of water.

6. A process as defined in claim 1 wherein $R^1$ is $R^7CH_2CH_2-$ and $R^7$ is perfluoroalkyl of 1 to 6 carbon atoms.

7. A process as defined in claim 1 wherein cyclic polysiloxane (i) is present in an amount of from 30 to 85 mol % of the mixture.

8. A process as defined in claim 1 wherein cyclic polysiloxane (i) is present in an amount of from 30 to 85 mol % of the mixture.

9. A process for producing diorganopolysiloxane copolymers having a viscosity of from 50 to 200,000,000 centipoise at 25° C. capable of providing fluorosilicones with enhanced solvent resistance in comparison with a corresponding homopolymer blend and of forming a stable, inseparable oil at the lower viscosities, said process comprising (a) reacting a mixture of
(i) a cyclic polysiloxane of the formula, $$((CH_3)(CF_3CH_2CH_2)SiO)_4$$

(ii) a cyclic polysiloxane of the formula, $$((CH_3)_2SiO)_y$$

wherein y is from 3 to 4, or mixed such polysiloxanes, (i) being present in an amount of from 30 to 98 mol % of the mixture of (i) and (ii) at a temperature in the range of 0° to 90° C. in the presence of 5 to 300 parts per million of a catalyst selected from the group consisting of CsOH, a silanolate thereof, or a compound of the formula,

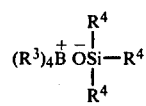

wherein $R^3$ is alkyl of 1 to 8 carbon atoms, cycloalkyl of 4 to 8 carbon atoms or phenyl, B is nitrogen or phosphorous, $R^4$ is alkyl of 1 to 8 carbon atoms, cycloalkyl of 4 to 8 carbon atoms, phenyl, a siloxane chain of the unit formula, $R_a{}^5SiO_{(4-a)/2}$ and mixtures thereof wherein $R^5$ is monovalent hydrocarbon or halogenated monovalent hydrocarbon, a is from 1.5 to 2.5, and (b) neutralizing the catalyst in the reaction mixture after equilibrium has been reached.

* * * * *